US008819638B2

(12) United States Patent
Sharma et al.

(10) Patent No.: US 8,819,638 B2
(45) Date of Patent: Aug. 26, 2014

(54) APPLICATION PROTOYPING SUITE

(75) Inventors: Alok Sharma, Lisle, CT (US); Yigang Cai, Naperville, IL (US)

(73) Assignee: Alcatel Lucent, Boulogne-Billancourt (FR)

(*) Notice: Subject to any disclaimer, the term of this patent is extended or adjusted under 35 U.S.C. 154(b) by 335 days.

(21) Appl. No.: 13/237,223

(22) Filed: Sep. 20, 2011

(65) Prior Publication Data

US 2013/0074046 A1    Mar. 21, 2013

(51) Int. Cl.
G06F 9/44 (2006.01)
G06F 11/00 (2006.01)
G06F 11/36 (2006.01)

(52) U.S. Cl.
CPC ........ G06F 11/3692 (2013.01); G06F 11/3672 (2013.01)
USPC .............. 717/126; 717/100; 717/124; 714/37

(58) Field of Classification Search
CPC ............ G06F 11/3668; G06F 11/3672; G06F 11/3692
USPC .................... 717/100, 124–135; 714/37, 38.1
See application file for complete search history.

(56) References Cited

U.S. PATENT DOCUMENTS

| | | | | |
|---|---|---|---|---|
| 6,275,976 | B1 * | 8/2001 | Scandura | 717/120 |
| 7,478,026 | B1 * | 1/2009 | Kushner et al. | 703/13 |
| 8,112,743 | B2 * | 2/2012 | Defour et al. | 717/135 |
| 8,285,403 | B2 * | 10/2012 | Salvatore et al. | 700/94 |
| 8,312,415 | B2 * | 11/2012 | Marius et al. | 717/101 |
| 2002/0165797 | A1 * | 11/2002 | Deitrickson | 705/26 |
| 2005/0197108 | A1 * | 9/2005 | Salvatore et al. | 455/414.3 |
| 2008/0127101 | A1 * | 5/2008 | Anafi et al. | 717/125 |
| 2008/0235655 | A1 * | 9/2008 | Defour et al. | 717/104 |
| 2008/0250385 | A1 * | 10/2008 | Sanchez | 717/100 |
| 2008/0263504 | A1 * | 10/2008 | Marius et al. | 717/100 |
| 2008/0263505 | A1 * | 10/2008 | StClair et al. | 717/101 |
| 2009/0125891 | A1 * | 5/2009 | Garimella et al. | 717/131 |
| 2010/0218172 | A1 * | 8/2010 | Randimbivolona | 717/135 |
| 2011/0023016 | A1 * | 1/2011 | Khader et al. | 717/120 |
| 2011/0258595 | A1 * | 10/2011 | Clevenger | 717/106 |
| 2012/0179587 | A1 * | 7/2012 | Hill et al. | 705/34 |
| 2012/0180027 | A1 * | 7/2012 | Yu et al. | 717/126 |

OTHER PUBLICATIONS

Dey et al., "A Conceptual Framework and a Toolkit for Supporting the Rapid Prototyping of Context-Aware Applications," 2001, Human-Computer Interaction, p. 97-166.*
Li et al., "Topiary: A Tool for Prototyping Location-Enhanced Applications," Oct. 2004, ACM, p. 217-226.*
Cassou et al., "A Tool Suite to Prototype Pervasive Computing Applications," 2010, IEEE, p. 820-822.*

* cited by examiner

*Primary Examiner* — Qing Chen
(74) *Attorney, Agent, or Firm* — Kramer Amado P.C.

(57) ABSTRACT

Various exemplary embodiments relate to a method and related network node including one or more of the following: an application storage that stores code defining an application, wherein the code is received by the prototyping suite from the developer device; a testing controller configured to effect performance of at least one test in association with the application to produce at least one test result; a certification controller configured to analyze the at least one test result to determine whether the application meets a certification requirement of a first plurality of certification requirements; and an application marketplace server configured to provide the application to at least one other device when the certification controller has determined that the application meets each certification requirement of the first plurality of certification requirements.

27 Claims, 8 Drawing Sheets

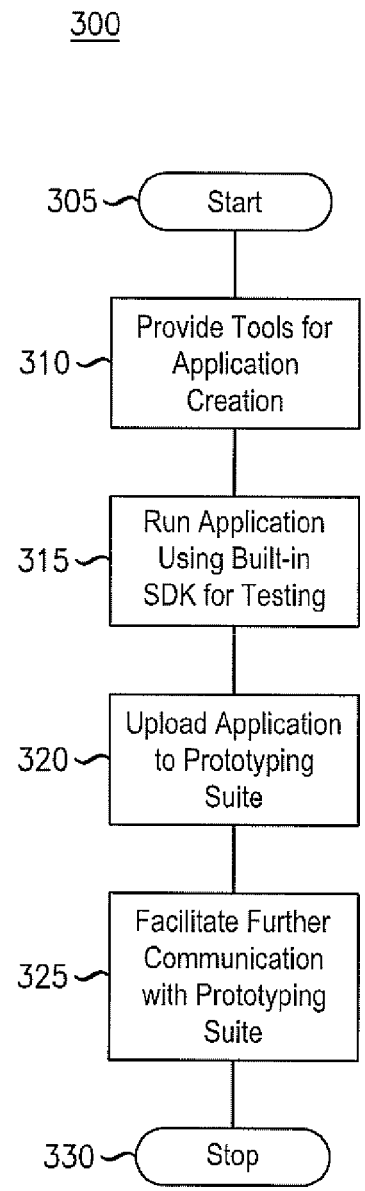
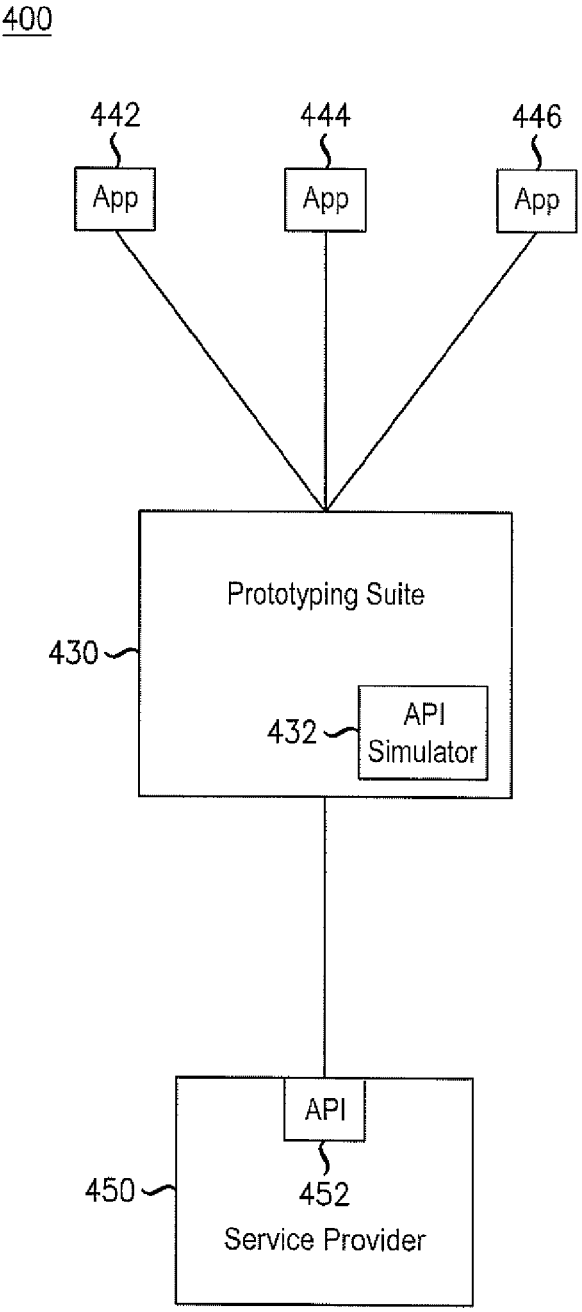
FIG. 3
FIG. 4

| | General Security | Apple Security | Power Usage | Content | ... | |
|---|---|---|---|---|---|---|
| Apple iPhone 3G | 90 | 95 | 70 | pass | ... | 930 |
| Apple iPhone 4G | 90 | 90 | 70 | pass | ... | 940 |
| HTC Thunderbolt | 85 | - | 85 | - | ... | 950 |
| Nokia Astound | 70 | - | 70 | pass | ... | 960 |
| ... | ... | ... | ... | ... | ... | 970 |

APPLICATION PROTOYPING SUITE

TECHNICAL FIELD

Various exemplary embodiments disclosed herein relate generally to application development.

BACKGROUND

As a result of the widespread adoption of smart-phones, the number of different platforms available for execution of applications has exploded. In addition to the relatively few operating systems available for other devices such as personal computers, application developers must now consider a number of new mobile operating systems (such as WINDOWS MOBILE, GOOGLE ANDROID, APPLE IPHONE, and NOKIA SUMBIAN operating systems) in order to ensure broad operability. Adding to this dilemma, equipment and service providers often add to or otherwise alter open operating systems such as the GOOGLE ANDROID operating system, thereby requiring application developers to take numerous versions of the same operating system into account when testing an application.

In many cases, the only way to ensure that an application will operate correctly on these various devices is to test the application on each such device or using an associated software development kit (SDK). This process, however, is time consuming and requires the developer to obtain the devices or SDKs to be evaluated before testing and debugging may commence.

Additionally, application developers often seek to integrate functionality of their application with other systems. For example, a developer may wish to retrieve a user's location from a GPS system or may wish to interface with a payment processor. While such third-party systems often provide application programmer interfaces (APIs), proper utilization often demands thorough research into each API. Further, it is often difficult for a developer to test their application's interaction with an API; untested code may incur charges for API use and/or may have unintended effects.

Overall, application development is currently a daunting task. Developers are on their own to not only program an application, but to test it against various devices and APIs, ensure broad compatibility, obtain necessary certifications, submit finished applications to various application stores, and create demand for their application.

SUMMARY

Various exemplary embodiments relate to a prototyping suite for facilitating application development by a developer using a developer device, the prototyping suite including one or more of the following: an application storage that stores code defining an application, wherein the code is received by the prototyping suite from the developer device; a testing controller configured to effect performance of at least one test in association with the application to produce at least one test result; a certification controller configured to analyze the at least one test result to determine whether the application meets a certification requirement of a first plurality of certification requirements; and an application marketplace server configured to provide the application to at least one other device when the certification controller has determined that the application meets each certification requirement of the first plurality of certification requirements.

Various exemplary embodiments relate to a method performed by a prototyping suite for facilitating application development by a developer using a developer device, the method including one or more of the following: receiving, by the prototyping suite from the developer device, code defining an application; effecting performance of at least one test in association with the application to produce at least one test result; analyzing the at least one test result to determine whether the application meets a certification requirement of a first plurality of certification requirements; and providing the application to at least one other device when the application meets each certification requirement of the first plurality of certification requirements.

Various exemplary embodiments relate to a tangible and non-transitory machine-readable storage medium encoded with instructions for execution by a prototyping suite for facilitating application development by a developer using a developer device, the tangible and non-transitory machine-readable storage medium including one or more of the following: instructions for receiving, by the prototyping suite from the developer device, code defining an application; instructions for effecting performance of at least one test in association with the application to produce at least one test result; instructions for analyzing the at least one test result to determine whether the application meets a certification requirement of a first plurality of certification requirements; and instructions for providing the application to at least one other device when the application meets each certification requirement of the first plurality of certification requirements.

Various embodiments are described wherein, in effecting performance of the at least one test, the testing controller is configured to establish a sandbox for performance of the at least one test.

Various embodiments are described wherein, in effecting performance of the at least one test, the testing controller is configured to: establish a device emulator, the device emulator being configured to emulate an identified end user device; and configure the device emulator to run the application.

Various embodiments are described wherein, in effecting performance of the at least one test, the testing controller is configured to configure at least one test device to run the application, the test device being an identified end user device.

Various embodiments are described wherein, in effecting performance of the at least one test, the testing controller is configured to test an interaction between the application and an application programmer interface (API).

Various embodiments are described wherein: the testing module includes an API simulator, and in testing an interaction between the application and an API, the testing controller tests an interaction between the application and the API simulator.

Various embodiments are described wherein in testing an interaction between the application and an API, the testing module tests an interaction between the application and a live API, wherein the prototyping suite throttles the rate at which messages originating from the application are transmitted to the live API.

Various embodiments are described wherein, in effecting performance of the at least one test, the testing controller selects a test script for execution in association with the application, wherein selection of the test script is based on the first plurality of certification requirements.

Various embodiments are described wherein the first plurality of certification requirements is identified based on a set of end user devices identified by the developer as intended platforms for the application.

Various embodiments are described wherein: each end user device of the set of end user devices is associated with a plurality of certification requirements; and the first plurality of certification requirements is the plurality of certification requirements associated with a first end user device of the set of end user devices.

Various embodiments are described wherein in providing the application to at least one other device, the application marketplace server is configured to provide the application to an application store server.

Various embodiments additionally include at least one marketing tool configured to facilitate the creation of demand for the application.

Various embodiments are described wherein the at least one marketing tool is configured to initiate an advertising campaign.

BRIEF DESCRIPTION OF THE DRAWINGS

In order to better understand various exemplary embodiments, reference is made to the accompanying drawings, wherein:

FIG. 3 illustrates an exemplary method for facilitating application development at a developer device;

FIG. 4 illustrates an exemplary system for testing application interactions with an application programmer interface (API);

To facilitate understanding, identical reference numerals have been used to designate elements having substantially the same or similar structure and/or substantially the same or similar function.

DETAILED DESCRIPTION

Figure 1:
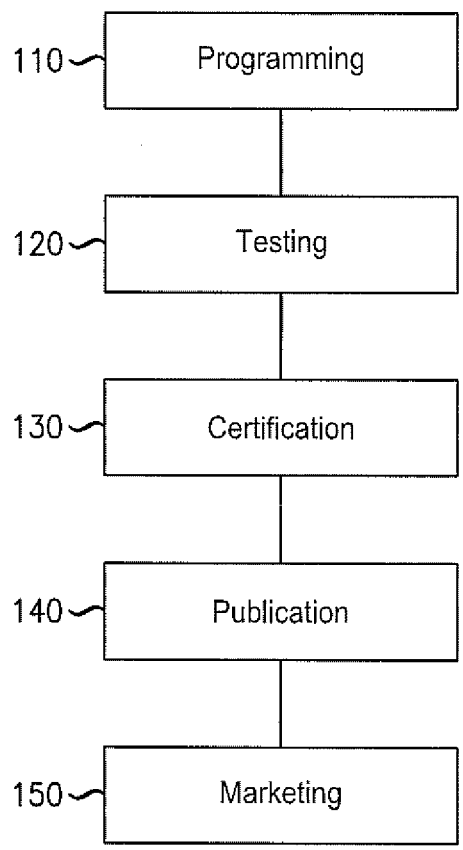
FIG. 1 illustrates an exemplary workflow for end-to-end application development.

In view of the foregoing, it would be desirable to provide a system to facilitate end-to-end application development. In particular, it would be desirable to provide a system that gathers various functions and resources necessary or useful in application development for access by a developer.

Referring now to the drawings, there are disclosed broad aspects of various exemplary embodiments.

FIG. 1 illustrates an exemplary workflow 100 for end-to-end application development. Exemplary workflow 100 may describe a number of phases in application development. Various embodiments described herein include a prototyping suite that may facilitate and/or automate at least portions of one or more phases of workflow 100.

In phase 110, a developer programs code defining an application. In various embodiments, the developer may program such code locally using virtually any programming language. For example, the developer may program an application using C, C++, C#, Ruby, Java, etc. Phase 110 may also include limited local testing to ensure that the code can be compiled.

Next, in phase 120, the developer may effect various testing of the application to ensure proper and intended function. The developer may install and run the application on various devices intended as platforms for the application. For example, the developer may run the application using an APPLE IPHONE operating system and GOOGLE ANDROID operating system SDKs to ensure operability on those platforms. Testing may include applying various test cases to the application to determine whether it will "break" or expose a security flaw under the conditions of each test case.

Once the application is fully tested and ensured to run satisfactorily, it may be certified in phase 130. Various application stores may have various certification requirements that must be met prior to an application being provided by the store. As such, the developer may either certify the application or ensure that the application will meet the certification requirements prior to submission to an application store. For example, a store may require that an application not overuse battery power or pass certain content restrictions.

After ensuring that the application meets relevant certification requirements, the developer may publish the application to one or more application stores in phase 140. For example, the developer may submit the application to the APPLE App Store and/or the GOOGLE ANDROID Marketplace. The developer may also set a price for the application and request a particular share of the revenue.

Finally, in phase 150, the developer may promote the published application. For example, the developer may initiate an advertising campaign, release a demonstration of the application, or provide some incentive to purchase the full application. By marketing the application, the developer attempts to create a demand to drive application purchase and/or download.

Note that the foregoing description is intended to provide a general overview of various application development phases facilitated by the systems described herein and may be simplified in some respects. More detailed description of such phases will be described in greater detail below.

Figure 2:
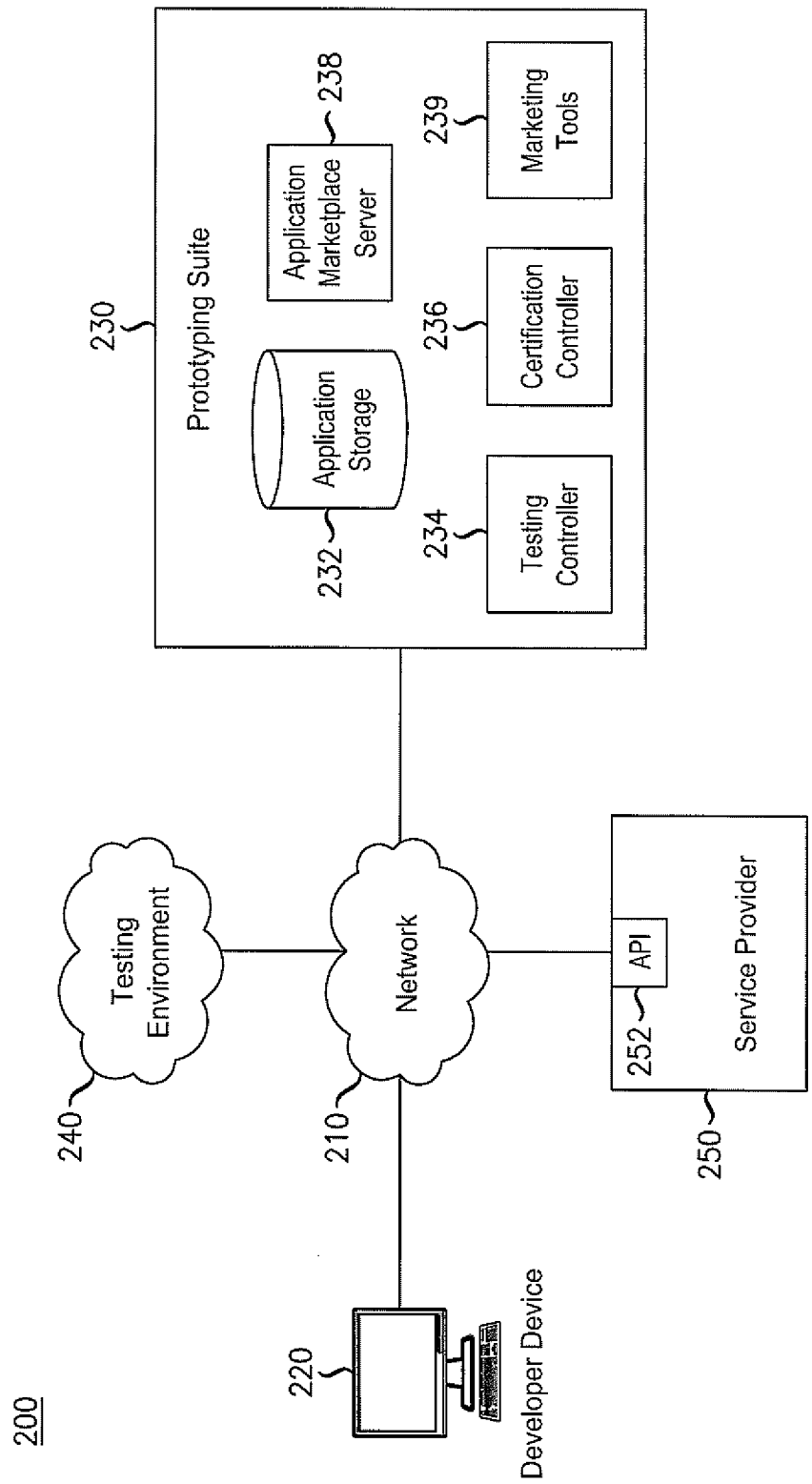
FIG. 2 illustrates an exemplary system for end-to-end application development.

FIG. 2 illustrates an exemplary system 200 for end-to-end application development. Exemplary system 200 may include various components such as network 210, developer device 220, prototyping suite 230, testing environment 240, and service provider 250.

Network 210 may be a device or group of devices adapted to provide communication between other components of exemplary system 200. Accordingly, network 210 may include a number of routers and/or switches for forwarding packets of to appropriate destinations. In various embodiments, network 210 may include the Internet.

Developer device 220 may be any device used by a developer to program an application and/or communicate with other components of system 200. Accordingly, developer device 220 may be a personal or laptop computer, server, tablet, wireless email device, cell phone, smart phone, television set-top box, or any other device capable of communicating with other devices via network 210.

In programming the application, the developer may utilize prototyping suite portal software installed on developer device 220. Such portal software may include an integrated development environment (IDE), one or more software development kits (SDKs) for application testing, preprogrammed code for interfacing with one or more application programmer interfaces (APIs), and/or other tools for facilitating application programming. The portal software may also provide functionality for communicating with other components of system 200 by, for example, uploading the application to prototyping suite 230 and/or interacting with devices or device emulators in testing environment 240. In various alternative embodiments, rather than uploading the application directly to the prototyping suite, the portal software may upload the application to a central upload and development mechanism (not shown) which may, in turn, transmit the application to prototyping suite 230. In various embodiments, this portal software may be a web browser.

Prototyping suite 230 may be any device or group of devices adapted to facilitate and/or automate various aspects of application development. For example, prototyping suite 230 may automatically test and certify an application and facilitate publication and marketing of the application. Accordingly, prototyping suite 230 may include one or more personal or laptop computer, server, tablet, wireless email device, cell phone, smart phone, television set-top box, or any other devices capable providing various functions associated with prototyping suite 230. One exemplary embodiment of the hardware associated with prototyping suite will be explained below with reference to FIG. 5.

In various embodiments, prototyping suite may include an application storage 232, testing controller 234, certification controller 236, application marketplace server 238, and/or marketing tools 239. It should be apparent that prototyping suite 230 is, in some respects, a simplification. The detailed operation of the components of prototyping suite will be described in further detail below.

Application storage 232 may store various applications created by developers and uploaded from various developer devices such as developer device 220. Application storage 232 may store various metadata along with the application. For example, application storage 232 may store a developer identifier, indications of intended platforms for the application, associated APIs, certification status, and/or application price. Various additional or alternative metadata useful in facilitating application development will be apparent to those of skill in the art.

Testing controller 234 may be adapted to facilitate performance of various tests with regard to an uploaded application. In various embodiments, testing controller 234 may install the application on at least one device or device emulator within testing environment 240. Thereafter, testing controller 234 may execute one or more test scripts by sending commands to the now-running application and receiving results. Testing controller 234 may compare these results to expected results to determine whether and/or to what degree of satisfaction the application passes the current test. Testing controller 234 may also enable the developer, through the portal software, to interact with the running application to perform manual testing.

Certification controller 236 may be adapted to analyze test results to determine whether an uploaded application meets one or more certification requirements for publication to one or more application stores. In various embodiments, certification controller may be adapted to inform testing controller 234 as to which tests should be run for certification. For example, if the application has not yet passed a required security testing script to an appropriate degree of satisfaction, certification controller 236 may inform testing controller that the security testing script should be run. Additionally or alternatively, certification controller 236 may communicate to developer device 220 which certification requirements have not been met and/or which tests should be run for certification. The developer may then manually initiate such tests using the portal software. Once certification controller 236 determines that the application meets all requirements for at least one of its intended platforms, certification controller may indicate that the application is certified for distribution to such platforms by storing such information in application storage 232 and/or sending such an indication to application marketplace server 238.

Application marketplace server 238 may be adapted to provide certified applications to various other devices. In various embodiments, application marketplace server 238 may allow managers of various application stores to browse published and certified applications and to choose to list such applications for purchase in their application stores. For example, representatives of the GOOGLE ANDROID Application Market may browse available applications and select applications for listing in the Application Market. In various embodiments, application marketplace server 238 may additionally or alternatively be adapted to provide applications directly to end user devices. Application marketplace server 238 may perform various additional functions such as, for example, collecting revenue from various application stores and distributing said revenue to developers, service providers, and other entities.

Marketing tools 239 may include various tools for use by the developer in creating demand for the published application. For example, marketing tools 239 may be adapted to initiate various types of advertising campaigns for an application. As another example, marketing tools 239 may be adapted to create a demo version of the application and publish such demo on the application marketplace server 238. Various additional functions for generating demand for an application that may be included in marketing tools 239 will be apparent to those of skill in the art.

Testing environment 240 may include one or more devices for executing application code for testing purposes. In various embodiments, testing environment 240 may constitute part of prototyping suite 230. In various embodiments, testing environment may include one or more servers which may be arranged according to a cloud computing architecture. Such servers may host sandboxes within which application code may be tested. As used herein, the term "sandbox" will be understood to refer to a testing environment having dedicated resources for use in testing code. Within such sandboxes, various device emulators may be instantiated and configured to run the application code. For example, testing controller 234 may establish a sandbox in testing environment 240, instantiate an APPLE IPHONE mobile phone emulator and an HTC THUNDERBOLT mobile phone emulator within the sandbox, and install the application on both emulators. Thereafter, the application may be tested with regard to both platforms.

Additionally or alternatively, testing environment 240 may include one or more actual end-user devices for testing applications. For example, testing environment 240 may include a "device bank" of various physical end user devices, use of which may be scheduled by various developers. Testing environment may additionally or alternatively include a number of "beta testers" for testing an application. Such beta testers may be physical device owners that have volunteered or otherwise agreed to test an application on their device.

Service provider 250 may be any device adapted to provide a service for various applications at runtime. Accordingly, service provider 250 may be a personal or laptop computer, server, tablet, wireless email device, cell phone, smart phone, television set-top box, or any other device capable of communicating with other devices via network 210. Service provider 250 may provide virtually any service for applications. For example, service provider may transmit a location of a user to an application, enable a user to make payments using an application, or enable integration with a social networking system. Numerous additional services that may be provided by a service provider 250 will be apparent to those of skill in the art. Further, it should be noted that while one service provider 250 is illustrated in exemplary system 200, numerous additional service providers (not shown) may be available for interaction with an application.

To enable communication between service provider 250 and various applications, service provider 250 may include one or more application programmer interfaces (APIs) 252. API 252 may include hardware and/or executable instructions encoded on a machine-readable medium for communicating with an application. For example, API 252 may be adapted to listen for incoming messages on one or more TCP ports dedicated to the API and to process such messages according to a predefined API grammar. For example, in the case where service provider 250 provides location information to various applications, API may receive a message that includes predefined fields storing an indication that the message is requesting a user location, an application identifier for ensuring that the application is authorized to receive such information, and a device identifier for indicating which user is to be located. Recognizing such message as valid according to the API grammar, service provider may proceed to process the message and return the requested information to the application via API 252.

FIG. 3 illustrates an exemplary method 300 for facilitating application development at a developer device. Method 300 may be performed, for example, by developer device 220 of exemplary system 200. In various embodiments, method 300 may be performed by prototyping suite portal software installed on such a developer device.

Method 300 may begin in step 305 and proceed to step 310 where the developer device may provide various tools for application creation. For example, the developer device may enable the developer to register a new application with the prototyping suite and program code defining the new application. As such, the developer device may provide an IDE. Step 310 may further include providing prebuilt code for interfacing with one or more APIs according to their accepted API grammars. As such, the developer may simply call a prebuilt function to interface with an API rather than researching the associated API grammar and constructing outgoing messages accordingly. Various additional tools useful in facilitating application creation will be apparent to those of skill in the art.

Next, after the application has been created, the developer device may provide local testing capabilities in step 315. For example, the developer device may include one or more compilers and/or built-in SDKs for testing application code and/or ensuring that the application will run on one or more devices. During this step, the developer may manually interact with the application to ensure basic functionality and reliability.

When the developer wishes to use the resources of a prototyping suite, the developer device may upload the application to the prototyping suite in step 320 for further testing, certification, publication, and marketing. Then, in step 325, developer device 325 may facilitate any further communications with the prototyping suite throughout the remainder of application development. For example, developer device may display test results and certification requirements reported by the prototyping suite, enable manual interaction with a device or device emulator, and/or enable transmission of instructions to schedule testing, publish a certified application, and/or utilize a marketing tool. Various additional forms of communication that may be facilitated in step 325 by the developer device and/or portal software will be apparent from further description of the systems below.

It should be noted that, while exemplary method 300 illustrates a sequence of steps, the steps may be performed in alternative orders. For example, a developer may create application code in step 310, immediately upload the application in step 320, test the application on the prototyping suite in step 325, remedy errors in the code by returning to step 310, perform additional local testing in step 315, then proceed to upload the new code in step 320. Various additional orderings will be apparent to those of skill in the art.

FIG. 4 illustrates an exemplary system 400 for testing application interactions with an application programmer interface (API). Various components of exemplary system 400 may correspond to components of exemplary system 200. For example, prototyping suite 430 may correspond to prototyping suite 230 and service provider 450 may correspond to service provider 250. Further, applications 442, 444, 446 may run within testing environment 240. For example, application 442 may run on a device emulator, application 444 may run on a device in a bank of end user devices, and application 446 may run on an end user device of a beta tester.

In exemplary system 400, each application 442, 444, 446 may currently be under testing to ensure proper interaction with service provider 450. Prototyping suite 430 may provide various tools for testing such interaction in an environment that is not fully live. For example, in various embodiments, prototyping suite 430 may include an API simulator 432 adapted to simulate API 452 of service provider 450. In such embodiments, applications 442, 444, 446 may direct API messages to an interface of prototyping suite 432. Prototyping suite 432 may then direct such API messages to API simulator 432 for any applications 442, 444, 446 that are currently configured for testing with API simulator 432. API simulator may then analyze the message and generate a simulated response message, which prototyping suite may transmit to the appropriate application 442, 444, 446. As such, applications 442, 444, 446 may test for proper API interaction without actually interacting with service provider 450. As such, developers may avoid charges from service provider or unintended commands being sent to service provider 450. Further, by providing API simulator 432 to prototyping suite 430, service provider 450 may avoid processing malformed, erroneous, and other test messages sent by applications 442, 444, 446.

As another means of testing API interaction, prototyping suite 430 may offer a "live throttled" mode. According to live throttled operation, applications 442, 444, 446 may again direct API messages to an interface of prototyping suite 432. Prototyping suite 432 may then direct such API messages to API 452 for any applications 442, 444, 446 that are currently configured for testing in live throttled mode. In doing so, prototyping suite 430 may throttle the rate that such messages are forwarded to ensure that service provider 450 is not overwhelmed by a large number of messages erroneously sent by an application 442, 444, 446.

It should be apparent that different applications may employ different testing methods at the same time. For example, application 442 may utilize API simulator 432 while application 444 may utilize API via the live throttled mode of prototyping suite 430. Further, application 446 may use API in a fully live manner and directly interface with API 452 without routing requests through prototyping suite 430.

Figure 5:
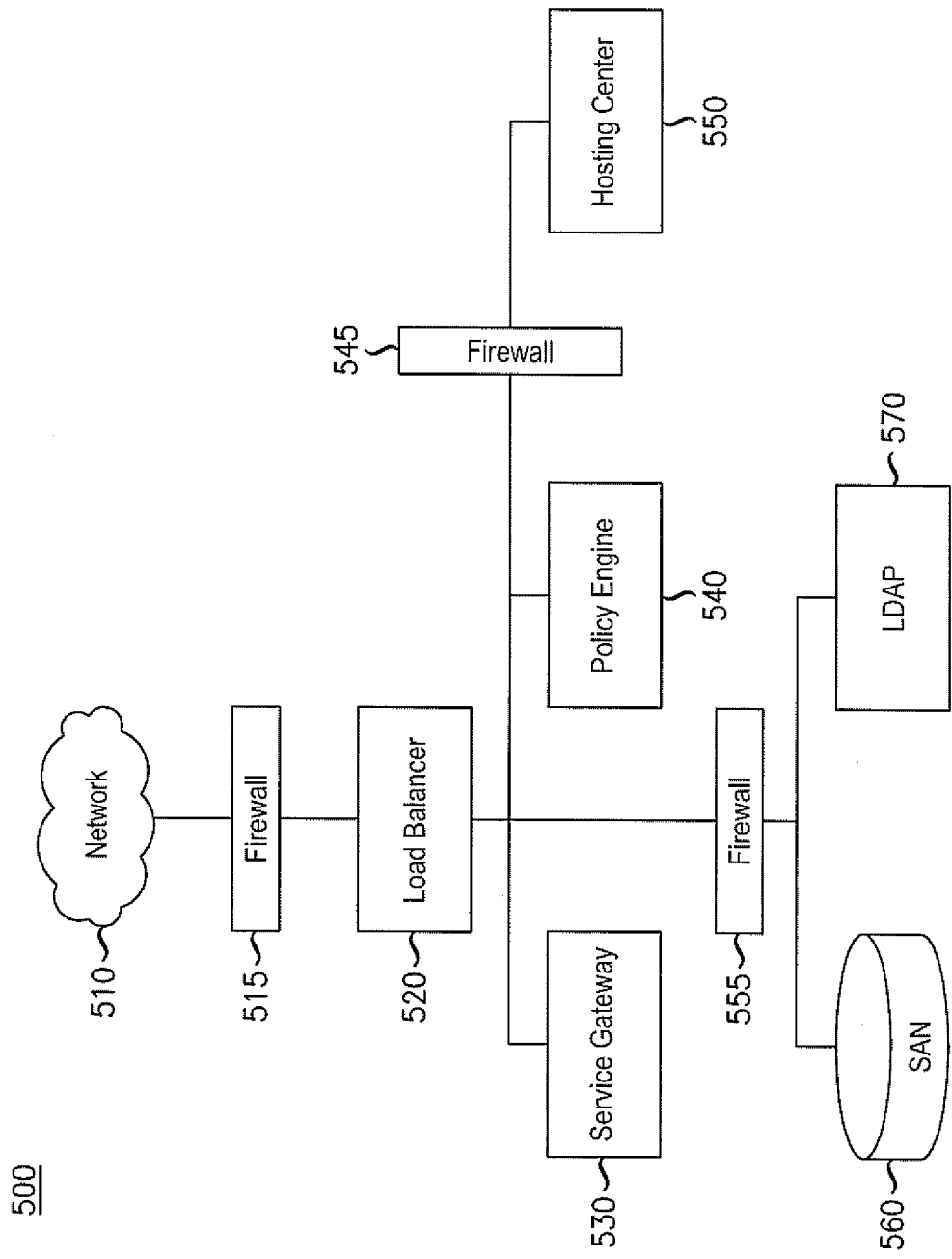
FIG. 5 illustrates exemplary components of a prototyping suite.

FIG. 5 illustrates exemplary components 500 of a prototyping suite. Components 500 may be included in a prototyping suite such as prototyping suite 230 and/or prototyping suite 430. Components 500 may include a network 510, firewall 515, load balancer 520, service gateway 530, policy engine 540, firewall 545, hosting center 550, firewall 555, storage area network (SAN) 560, and lightweight directory access protocol server (LDAP) 570.

Network 510 may be a device or group of devices adapted to provide communication with other devices. In various embodiments, network 510 may correspond to network 210 of exemplary system 200. Accordingly, network 510 may include a number of routers and/or switches for forwarding packets of to appropriate destinations. In various embodiments, network 510 may include the Internet.

Firewall 515 may be a device or group of devices comprising hardware and/or executable instructions encoded on a machine-readable medium configured to monitor communications between network 510 and load balancer 520. Firewall 515 may attempt to identify and subsequently block malicious traffic incoming from network 510. As such, firewall 515 may provide a measure of security for a prototyping suite as well as the separation of the prototyping suite from other systems hosted on the operator's local network.

Load balancer 520 may be a device or group of devices comprising hardware and/or executable instructions encoded on a machine-readable medium configured to distribute incoming messages to appropriate components. For example, various embodiments may include multiple and/or redundant components such as multiple policy engines (not shown) and/or service gateways (not shown). Load balancer 520 may distribute messages among multiple components according to the current load on those components. Load balancer 520 may handle redundancy, wherein each element operates in one of active or standby mode, by mapping incoming requests to the appropriate active components.

Service gateway 530 may be a device or group of devices comprising hardware and/or executable instructions encoded on a machine-readable medium configured to perform various functions associated with a prototyping suite. In various embodiments, service gateway 530 may include an Alcatel-Lucent 8550 web services gateway. Service gateway 530 may be implemented on a Linux/Unix platform with secure sockets layer (SSL) capabilities and extensible markup language (XML) hardware acceleration.

Service gateway 530 may receive, process, and/or forward messages between various applications and APIs of service providers. As such, the service gateway may provide an application interface and a service provider interface. The application interface may be used by various applications to communicate with APIs and API simulators. Such communication may occur, for example, according to the TCP/IP and HTTPS protocols. The application interface may be exposed to the Internet and, as such, service gateway 530 may only process those requests that present proper credentials. For example, each application may be required to present a user name and password prior to accessing an API. Similarly, the service provider interface may be used by a prototyping suite to communicate with various service providers. Such communication may occur, for example, according to the TCP/IP and HTTPS protocols.

Service gateway 530 may provide a number of functions. In various embodiments, service gateway 530 may virtualize SOAP services exposed by the prototyping suite and may route application requests to service providers and/or policy engine 540, as appropriate. Service gateway 530 may also throttle application requests according to a specified number of transactions per second (TPS) and/or daily quota associated with a developer or application. Additionally, service gateway 530 may perform various forms of authorization of application requests. For example, service gateway 530 may authorize application requests based on a provided username and password, based on whether an associated phone number is listed in a previously defined white list associated with the application, and/or based on a consent given or denied by subscribers having a phone number on a previously defined consent list associated with the application. Service gateway 530 may also collect analytics data and keep audit logs with regard to each application. In performing various functions, service gateway 530 may utilize data provisioned within service gateway 530 and/or data accessible via LDAP 570.

Policy engine 540 may be a device or group of devices comprising hardware and/or executable instructions encoded on a machine-readable medium may provide a services upload interface through which a central upload and development mechanism may upload data such as an application and/or associated metadata to a prototyping suite. The services upload interface may also be used by the central upload and development mechanism to retrieve reports of subscriber events. Such communication may occur, for example, according to the TCP/IP and HTTPS protocols. The services upload interface may be exposed to the Internet and, as such, service gateway 530 may only process those requests that present proper credentials. Messages received via the services upload interface may be first received by the service gateway 530 and subsequently forwarded and processed by policy engine 540. In various embodiments, policy engine may be implemented on one or more general purpose computing blades.

In processing requests received via the services upload interface, policy engine 540 may update the contents of LDAP 570. For example, policy engine may receive a message including an updated white list or consent list to be stored in LDAP 570 for future use by service gateway 530. Policy engine 540 may perform various additional functions such as, for example, performing an advice of privacy (AOP) process to obtain consent status from subscribers on a consent list when appropriate and relaying mobile originated messages from subscribers to appropriate applications.

Firewall 545 may be a device or group of devices comprising hardware and/or executable instructions encoded on a machine-readable medium configured monitor communications between hosting center 550 and other components of the prototyping suite. Firewall 545 may attempt to identify and subsequently block malicious traffic received from hosting center 550. As such, firewall 545 may restrict access from hosting center 550 to only authorized personnel.

Hosting center 550 may be a device or group of devices representing any other devices and/or intranet at the hosting center for the prototyping suite. As such, hosting center 550 may include devices configured to allow an operator to monitor the operation of the components of the prototyping suite.

Firewall 555 may be a device or group of devices comprising hardware and/or executable instructions encoded on a machine-readable medium may be a device or group of devices comprising hardware and/or executable instructions encoded on a machine-readable medium configured monitor communications and to attempt to identify and subsequently block malicious traffic transmitted to SAN 560 and LDAP 570. As such, firewall 555 may provide an additional level of security for sensitive data, thereby dividing the components 500 of the prototyping suite among two tiers. In various embodiments, load balancer 520, service gateway 530, and policy engine 540 may be tier 1 devices while SAN 560 and LDAP 570 may be tier 2 devices. In some such embodiments, firewall 555 may only allow tier 1 devices to access tier 2 devices.

Storage area network (SAN) 560 may be a device or group of devices comprising hardware and/or executable instructions encoded on a machine-readable medium configured to store various data used by a prototyping suite. As such, SAN 560 may include a high capacity, high reliability, redundant storage device. Data may be routinely backed-up and stored offsite.

Lightweight directory access protocol server (LDAP) 570 may be a device or group of devices comprising hardware and/or executable instructions encoded on a machine-readable medium configured to store various data, such as authorization data, used by a prototyping suite. LDAP 570 may store static pre-provisioned data as well as dynamic data managed by policy engine 540 according to messages received from the central upload and development mechanism. In various embodiments, LDAP 570 may include an Alcatel-Lucent 8661 LDAP product.

Figure 6:
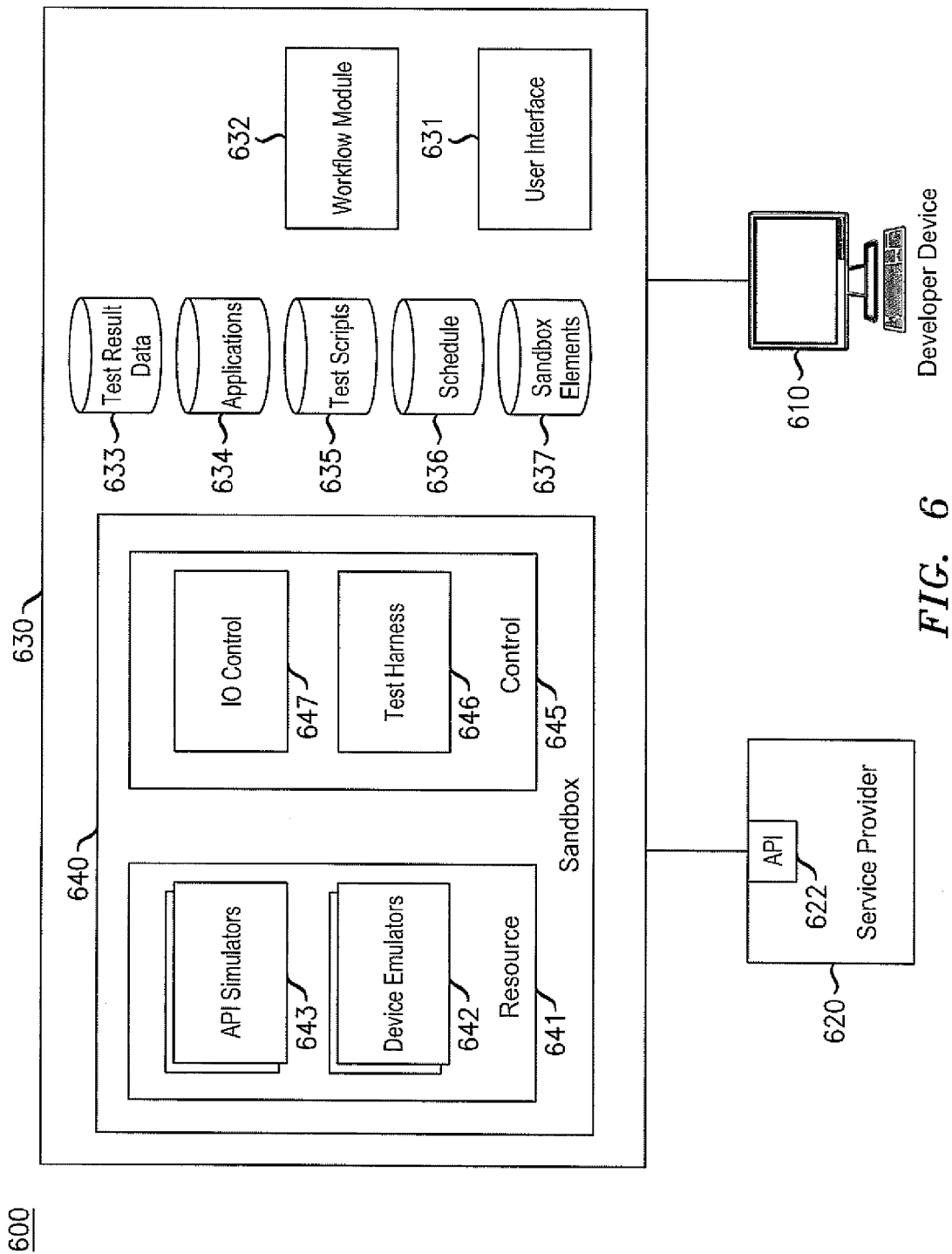
FIG. 6 illustrates an exemplary system for testing an application within a sandbox.

FIG. 6 illustrates an exemplary system 600 for testing an application within a sandbox. Exemplary system 600 may correspond to exemplary system 200 and/or exemplary system 400. Exemplary system 600 may include a developer device 610, service provider 620 having API 622, and prototyping suite 630. Developer device 610 may correspond to developer device 220 while service provider 620 may correspond to service provider 250.

Prototyping suite 630 may include a number of components for providing sandbox-based testing. As shown, prototyping suite 630 may include user interface 631, workflow module 632, and one or more storage devices 633-37 for storing various data useful in performing sandbox-based testing. Such components may also be components of testing controller 234.

User interface 631 may include hardware and/or executable instructions encoded on a machine-readable medium configured to enable communication between developer device 610 and prototyping suite 630. In various embodiments, user interface 631 may communicate with portal software installed on developer device 610 to provide access to one more components of prototyping suite 630. Such as workflow module 632.

Workflow module 632 may include hardware and/or executable instructions encoded on a machine-readable medium configured to guide a developer, via user interface 631, in configuring a sandbox for application testing. Accordingly, workflow module 632 may gather information from the developer such as, for example, what APIs are to be used, whether such APIs should be simulated or live throttled, when the test should be run, what devices or device emulators should be tested, what application should be tested, what test scripts should be used, and/or what test results should be returned. Such gathered information may then be stored among various storage devices 633-37, as will be described in greater detail below. Workflow module 632 may be further configured to subsequently create the sandbox instance according to the gathered information.

Storage devices 633-637 may include one or more any machine-readable medium. Accordingly, storage devices 633-637 may include a machine-readable storage medium such as read-only memory (ROM), random-access memory (RAM), magnetic disk storage media, optical storage media, flash-memory devices, and/or similar storage media. In various embodiments, storage devices 633-637 may constitute a single physical device or several separate devices. In various embodiments, storage devices 633-637 may be part of a SAN such as, for example, SAN 560.

Test result data 633 may store results of various tests performed on an application running within a sandbox. As such, test result data 633 may be accessible by developer device 610 via user interface 631 and/or by other devices such as a certification controller. Applications 634 may store one or more applications to be tested within a sandbox. Such applications may be stored as pre-compiled code specific to one or more devices or may be defined in a programming language that will be compiled upon creation of the sandbox. Test scripts 635 may store one or more scripts to be executed in testing an application. Such test scripts may be predefined or created by a developer. Schedule 636 may store a requested time and date for execution of each test. Schedule 636 may identify, for each scheduled test, which applications, test scripts, and other sandbox elements are to be instantiated or otherwise utilized. Sandbox elements 637 may store various additional elements for used in testing application code such as, for example, device emulators and/or API simulators.

In various embodiments, prototyping suite 630 may locally host one or more sandboxes such as sandbox 640. In various embodiments, one or more sandboxes 640 may additionally or alternatively be at least partially hosted at a site external to the prototyping suite. For example, sandbox 640 may be executed within a cloud computing architecture.

Sandbox 640 may include two major sets of components: resource components 641 and control components 645. Resource components 641 may provide various resources for execution of an application and simulation of a run-time environment. For example, resource components 641 may include one or more device emulators 642 on which an application being tested may run. Device emulators 642 may be instantiated within sandbox 640 based on code defining various device emulators stored with sandbox elements 637. Each device emulator 642 may emulate a real end-user device such as, for example, an APPLE IPHONE 4G mobile phone or an HTC THUNDERBOLT mobile phone. In various embodiments, one or more of device emulators 642 may be hosted external to prototyping suite 630. Such device emulators 642 may communicate with prototyping suite via an application interface, as previously described with respect to FIG. 5.

Resource components 641 may also include one or more API simulators 643. Device emulators 642 may transmit API requests directly to API simulators to test an application's interaction with a live API. Alternatively, device emulators may transmit such API requests to an application interface of prototyping suite 630. Prototyping suite 630 may, in turn determine whether each API request should be directed to an API simulator 643 or a live API 622 and forward the message accordingly. API simulators 643 may be instantiated within sandbox 640 based on code defining various API simulators stored with sandbox elements 637. Each API simulator 643 may simulate a real API of a service provider such as, for example, API 622 of service provider 620.

Control components 645 may include various components for controlling the operation of various tests and resource components 641 on applications. For example, test harness 646 may execute one or more test scripts specified by the developer. Such test scripts may be identified by the schedule 636 entry for the sandbox and/or may be retrieved from test scripts 635. Test harness 646 may issue various commands to device emulators to simulate user input, either directly or through IO control 647, as will be explained below. In various embodiments, test harness may reconfigure device emulators 642 and/or API simulators 643 to simulate various contexts. For example, test harness 646 may reconfigure a device emulator 642 such that device emulator 642 emulates a device having a low battery status or no data connection. Likewise, test harness 646 may reconfigure an API simulator 643 to simulate the responses of an API that is currently experiencing high demand.

Control components 645 may additionally include an input-output (IO) controller 647. IO controller 647 may interface with device emulators to transmit input and receive output. For example, IO control 647 may transmit various commands or other input to device emulators 642 at the instruction of test harness 646 and/or the developer via user interface 631. IO control 647 may also transmit device output to test harness 646 and/or the developer via user interface 631 such as, for example, an emulated screen image. IO control 647 may further be configured to receive the results of the various tests executed by test harness 646. IO control 647 may store such test results with test result data 633 for future review.

Figure 7:
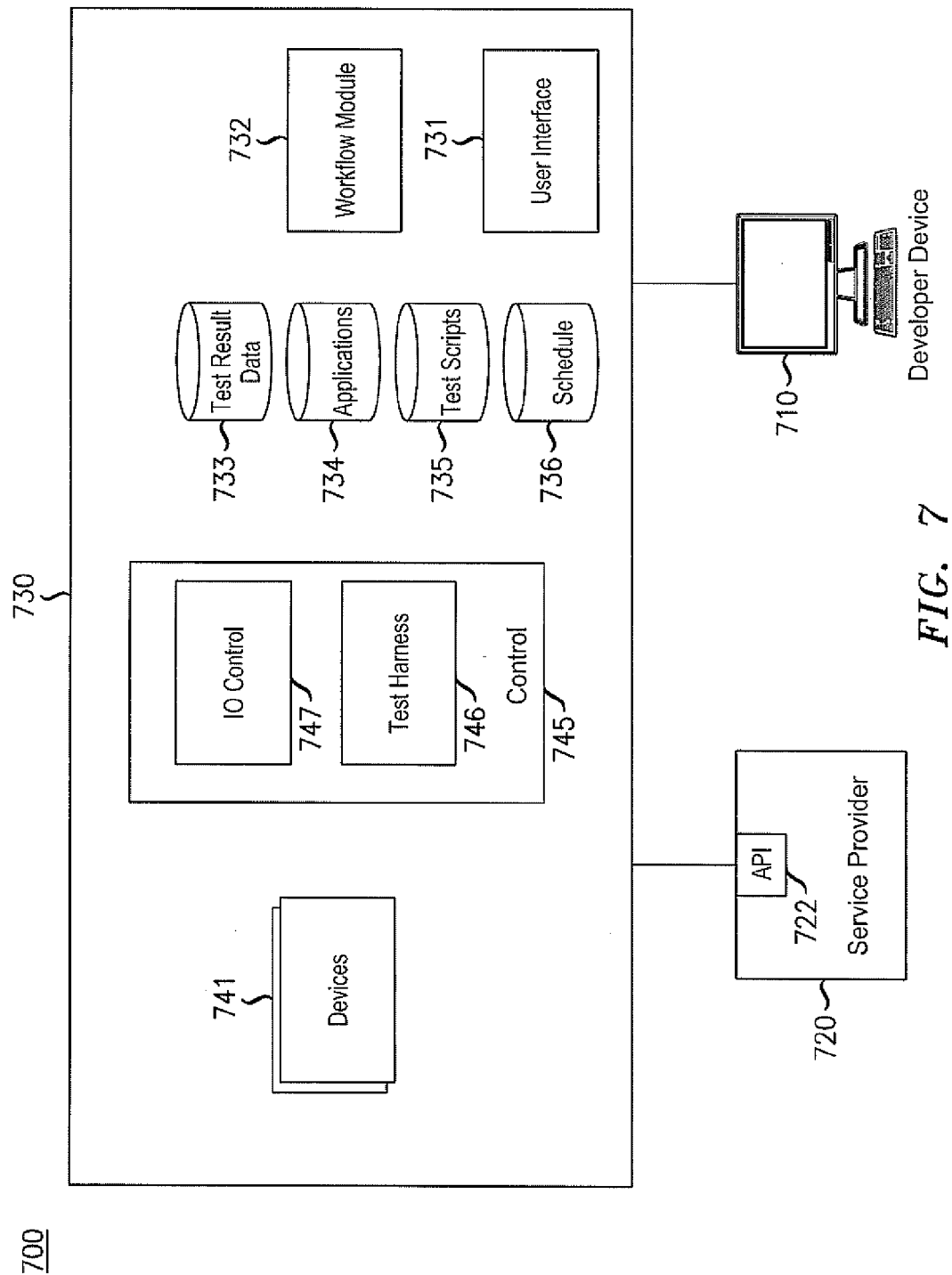
FIG. 7 illustrates an exemplary system for testing an application on live devices.

FIG. 7 illustrates an exemplary system 700 for testing an application on live devices. Exemplary system 700 may correspond to exemplary system 200, exemplary system 400, and/or exemplary system 600. Exemplary system 700 may include a developer device 710, service provider 720 having API 722, and prototyping suite 730. Developer device 710 may correspond to developer device 220 while service provider 720 may correspond to service provider 250.

Prototyping suite 730 may include a number of components for providing live device testing. As shown, prototyping suite 730 may include user interface 731, workflow module 732, and one or more storage devices 733-36 for storing various data useful in performing sandbox-based testing. Each of these components may be similar to corresponding components of prototyping suit 630. Prototyping suite 730 may additionally include various control components 745 for controlling the performance of various tests. For example, control components 745 may include a test harness 746 and an IO control 747. These components may be similar to components of prototyping suite 630.

Prototyping suite 730 may include one or more live end user devices 745. One or more devices 745 may belong to a bank of end user devices. As such, prototyping suite 730 may schedule the use of such devices by various developers in a manner similar to scheduling sandboxes in prototyping suite 630. Additionally or alternatively, one or more devices 745 may be end users devices owned and operated by a beta tester. Such beta testers may volunteer or otherwise agree to install application code on their device for testing purposes.

It should be noted that, while not illustrated, prototyping suite 730 may include one or more API simulators. Accordingly, devices 745 may transmit API requests to an application interface of prototyping suite 730. Prototyping suite 730 may, in turn, forward such messages to an appropriate API simulator (not shown) or live API such as API 722, as appropriate for the particular application under testing.

Figures 8, 9:
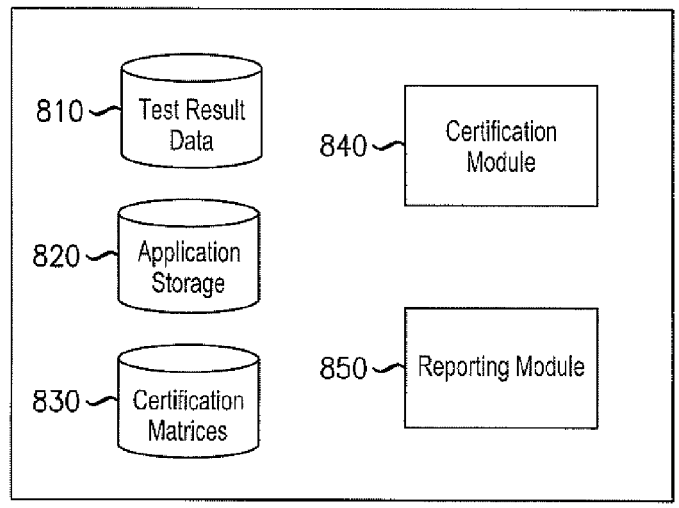
FIG. 8 illustrates an exemplary system for certifying an application.
FIG. 9 illustrates an exemplary certification matrix.

FIG. 8 illustrates an exemplary system 800 for certifying an application. Exemplary system 800, or portions thereof, may correspond to certification controller 236 of prototyping suite 230. Exemplary system 800 may include test result data 810, application storage 820, certification matrices 830, certification module 840, and reporting module 850.

Test result data 810 may be any machine-readable medium capable of storing results from previously performed application tests. For example, test result data 810 may correspond to test result data 633 of exemplary system 600 and/or test result data 733 of exemplary system 700. Additionally or alternatively, test result data 810 may include test results from other automated and/or manually-performed tests. Accordingly, schedule storage 810 may include a machine-readable storage medium such as read-only memory (ROM), random-access memory (RAM), magnetic disk storage media, optical storage media, flash-memory devices, and/or similar storage media.

Application storage 820 may be any machine-readable medium capable of storing uploaded applications and associated metadata. For example, application storage 820 may correspond to application storage 232 of exemplary system 200, applications 634 of exemplary system 600, and/or applications 734 of exemplary system 700. Accordingly, application storage 820 may include a machine-readable storage medium such as read-only memory (ROM), random-access memory (RAM), magnetic disk storage media, optical storage media, flash-memory devices, and/or similar storage media. In various embodiments, application storage 820 may share at least one physical device with test result data 810.

Certification matrices 830 may be any machine-readable medium capable of storing certification requirements for various devices. Accordingly, certification matrices 830 may include a machine-readable storage medium such as read-only memory (ROM), random-access memory (RAM), magnetic disk storage media, optical storage media, flash-memory devices, and/or similar storage media. In various embodiments, certification matrices 830 may share at least one physical device with test result data 810 and/or application storage 820. Exemplary contents of certification matrices 830 will be described in greater detail with respect to FIG. 9.

Certification module 840 may include hardware and/or executable instruction encoded on a machine-readable medium configured to determine whether an application has met sufficient certification requirements to be published. Accordingly, for each application, certification module 840 may analyze test result data 810 associated with the application and the relevant certification matrices 830 to determine whether that application can be certified. In various embodiments, certification module 840 may certify an application once it meets all certification requirements for just one intended platform while, in other embodiments, certification module 840 may only certify an application once it meets all certification requirements associated with all intended platforms. Upon determining that an application meets sufficient certification requirements for publication, certification module may update the metadata associated with the application in application storage 820 to indicate the application is certified for publication. Certification module may further provide detailed information regarding which certification requirements that the application meets and does not meet to reporting module 850.

Reporting module 850 may include hardware and/or executable instruction encoded on a machine-readable medium configured to indicate to a developer a certification status of an application. For example, reporting module may interface with portal software running on a developer device to convey such information. Based on metadata stored in application storage 820, reporting module may indicate for which platforms the application is certified. Further, based on certification matrices 830, reporting module 850 may indicate the certification requirements for the application. Further yet, based on information forwarded to reporting module 850 from certification module 840, as previously described, reporting module 850 may indicate whether each such requirement has been met by the application. Using this information, a developer may focus their efforts to modify the application to meet as-of-yet unmet certification requirements and, subsequently, submit the revised application for appropriate testing.

FIG. 9 illustrates an exemplary certification matrix 900. Certification matrix may be a table in a database or cache such as certification matrices 830. Alternatively, certification matrix 900 may be a series of linked lists, an array, or a similar data structure. Thus, it should be apparent that certification matrix 900 is an abstraction of the underlying data; any data structure suitable for storage of this data may be used.

In various embodiments, certification matrix 900 may include certification requirements for numerous potential application platforms. Such certification matrix may be generally applicable to any application developed using an associated prototyping suite. Alternatively, certification matrix may be generated specifically for a single application based on intended platforms, APIs, and other application features.

Certification matrix 900 may include certification requirements for a number of end user devices 910. As shown, end user devices 910 may include an APPLE IPHONE 3G mobile device, APPLE IPHONE 4G mobile device, HTC THUNDERBOLT mobile device, NOKIA ASTOUND mobile device, and numerous additional devices. Certification matrix 910 may also identify a number tests 910 associated with certification requirements. For example, certification matrix may include requirements associated with a "General Security" test script, "Apple Security" test script, "Power Usage" test script, "Content" test, and numerous additional tests. The "general security" test script may include a number of test cases design to test various security aspects of an application while the "Apple security" test script may include additional test cases specific to APPLE products and/or the APPLE App Store requirements. The "power usage" test script may determine average and/or maximum power consumption rates for an application. The "content" test may be a manual test wherein a testing party reviews the content of an application to determine whether the application meets standards and practices such as those enforced by various application stores.

Each requirement may be represented as a minimum acceptable outcome of an associated test. Various tests 920 may result in a numerical or other score. Other tests may be associated with a simple "pass/fail" metric. As an example, requirements list 930 indicates that, to be certified for distribution on the APPLE IPHONE 3G mobile device, an application should receive a result of "90" during execution of the "general security script, "95" on the "Apple security" script, "70" on the "power usage" script, and should pass the "content" test. Requirements lists 940, 950, and 960 indicate similar requirements. It should be noted that not every test 920 may apply to every device 910. For example, as shown in requirements list 950, an application may be published on the HTC THUNDERBOLT mobile device regardless of any result of the "Apple security" test script and "content" test. Certification matrix 900 may include numerous additional requirements lists 970.

Figure 10:
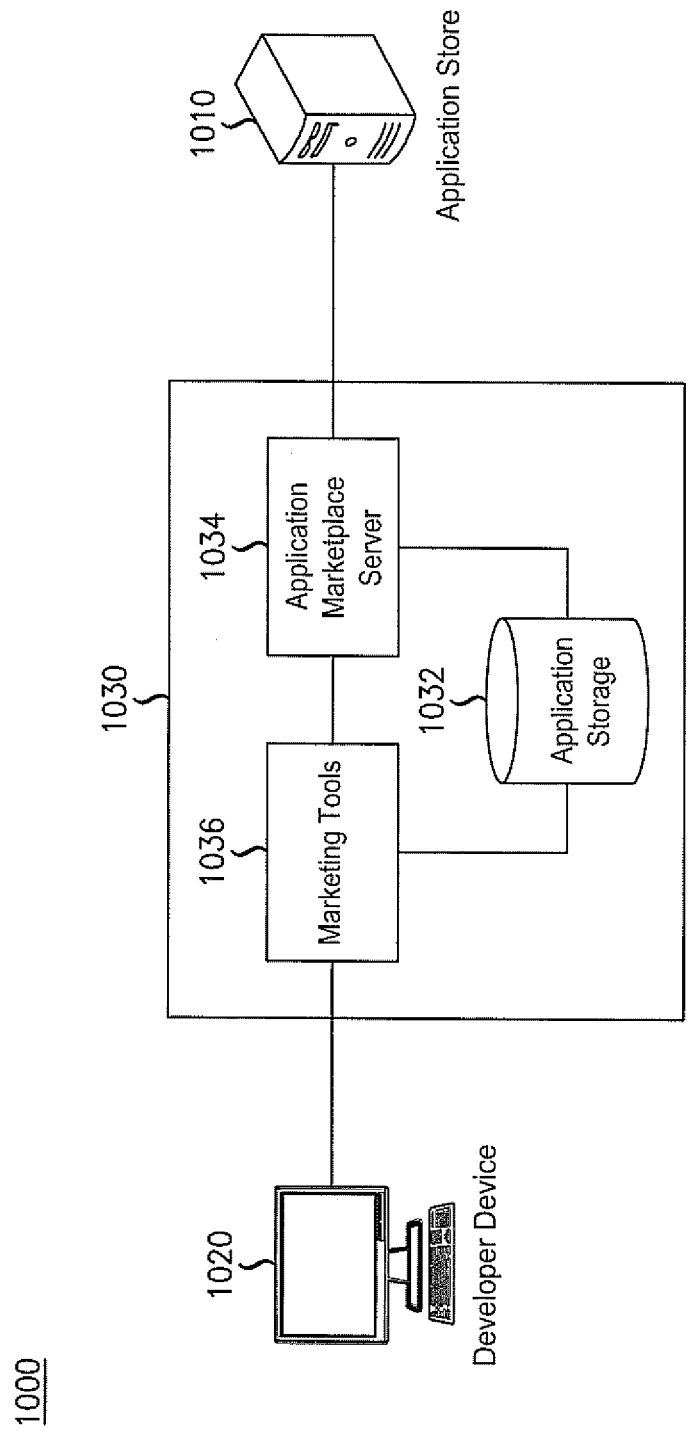
FIG. 10 illustrates an exemplary system for publishing and marketing a finished application.

FIG. 10 illustrates an exemplary system 1000 for publishing and marketing a finished application. Exemplary system 1000 may correspond to exemplary system 200 and may include application store 1010, developer device 1020, and prototyping suite 1030.

Application store 1010 may include one or more servers or other devices adapted to provide published applications to various end-user devices. For example, application store 1010 may include one or more servers associated with the APPLE App Store or GOOGLE ANDROID Application Market. Application store 1010 may interface with prototyping suite 1030 to provide applications developed using prototyping suite 1030 to such end user devices, as will be described in greater detail below. Developer device 1020 may correspond to developer device of 220 of exemplary system 200. Accordingly, developer device 1020 may include portal software adapted to facilitate communication with prototyping suite 1030.

Prototyping suite 1030 may correspond to prototyping suite 230, prototyping suite 430, prototyping suite 630, and/ or prototyping suite 730. Prototyping suite 1030 may include a number of components such as application storage 1032, application marketplace server 1034, and marketing tools 1036.

Application storage 1032 may be any machine-readable medium capable of storing uploaded applications and associated metadata. For example, application storage 1032 820 may correspond to application storage 232 of exemplary system 200, applications 634 of exemplary system 600, and/ or applications 734 of exemplary system 700, and/or application storage 820 of exemplary system 800. Accordingly, application storage 1032 may include a machine-readable storage medium such as read-only memory (ROM), random-access memory (RAM), magnetic disk storage media, optical storage media, flash-memory devices, and/or similar storage media.

Application marketplace server 1034 may include hardware and/or executable instruction encoded on a machine-readable storage medium adapted to publish certified applications to various application stores such as application store 1010. Once an application is certified for publication, a developer using developer device 1020 may indicate a desire to publish the application to one or more application stores. The developer may indicate publication information such as to which application stores the application should be published, a price for the application, and a requested revenue share to be returned to the developer for each sale. This information may be stored along with the application in application storage 1032.

Application marketplace server 1034 may provide application store 1010 with access to certified and published applications. For example, a manager of application store 1010 may browse such published applications, review associated metadata such as pricing information and certification status, and select applications for publication through application store 1010. In publishing an application through application store 1010, application store 1010 may download the application and associated metadata such that it may be served directly to end user devices by application store 1010. Alternatively, application store 1010 may simply download metadata describing the application and, upon receiving a purchase, direct the end-user device to download the application from application marketplace server 1034. In various embodiments, application marketplace server may alternatively or additionally include an application store for selling applications directly to end users without any action by application store 1010.

Marketing tools 1036 may include hardware and/or executable instruction encoded on a machine-readable storage medium adapted to provide various functionalities for creating demand for a published application. For example, marketing tools 1036 may interface with one or more advertising services and facilitate the creation of an advertising campaign by a developer using developer device 1020 for an application. As another example, marketing tools 1036 may be adapted to create a demonstration version of an application, such as a limited trial, and to publish the demo version on application marketplace. Various additional marketing tools will be apparent to those of skill in the art.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A prototyping suite for facilitating application development by a developer using a developer device, the prototyping suite comprising:
at least one hardware device comprising at least one processor, wherein the at least one processor supports:
an application storage configured to store code defining an application, wherein the code is received by the prototyping suite from the developer device;
a testing controller configured to effect performance of at least one test in association with the application to produce at least one test result;
a certification controller configured to:
identify a first end user device of a set of end user devices indicated by the developer as an intended platform for the application,
identify a first plurality of certification requirements as being associated with the first end user device of the set of end user devices, wherein the certification controller has access to a second plurality of certification requirements that are associated with a second end user device of the set of end user devices that is different from the first end user device of the set of end user devices, and
analyze the at least one test result to determine whether the application meets a certification requirement of the first plurality of certification requirements; and
an application marketplace server configured to provide the application to at least one other device when the certification controller has determined that the application meets each certification requirement of the first plurality of certification requirements.

2. The prototyping suite of claim 1, wherein, in effecting performance of the at least one test, the testing controller is configured to establish a sandbox for performance of the at least one test.

3. The prototyping suite of claim 1, wherein, in effecting performance of the at least one test, the testing controller is configured to:
establish a device emulator, wherein the device emulator is configured to emulate an identified end user device; and configure the device emulator to run the application.

4. The prototyping suite of claim 1, wherein, in effecting performance of the at least one test, the testing controller is configured to configure at least one test device to run the application, and wherein the at least one test device is an identified end user device.

5. The prototyping suite of claim 1, wherein:
the testing controller includes an API simulator, and
in effecting performance of the at least one test, the testing controller is configured to test an interaction between the application and the API simulator.

6. The prototyping suite of claim 1, wherein, in effecting performance of the at least one test, the testing controller is configured to test an interaction between the application and a live API, and wherein the prototyping suite throttles the rate at which messages originating from the application are transmitted to the live API.

7. The prototyping suite of claim 1, wherein, in effecting performance of the at least one test, the testing controller is configured to select a test script for execution in association with the application, and wherein selection of the test script is based on the first plurality of certification requirements.

8. The prototyping suite of claim 1, wherein:
each end user device of the set of end user devices is associated with a plurality of certification requirements; and
the first plurality of certification requirements is the plurality of certification requirements associated with the first end user device of the set of end user devices.

9. The prototyping suite of claim 1, wherein, in providing the application to the at least one other device, the application marketplace server is configured to provide the application to an application store server.

10. The prototyping suite of claim 1, further comprising at least one marketing tool configured to facilitate the creation of demand for the application.

11. A method performed by a prototyping suite for facilitating application development by a developer using a developer device, the method comprising:
receiving, by the prototyping suite from the developer device, code defining an application;
effecting performance of at least one test in association with the application to produce at least one test result;
identifying a first end user device of a set of end user devices indicated by the developer as an intended platform for the application;
identifying a first plurality of certification requirements as being associated with the first end user device of the set of end user devices, wherein the prototyping suite has access to a second plurality of certification requirements that are associated with a second end user device of the set of end user devices that is different from the first end user device of the set of end user devices;
analyzing the at least one test result to determine whether the application meets a certification requirement of the first plurality of certification requirements; and
providing the application to at least one other device when the application meets each certification requirement of the first plurality of certification requirements.

12. The method of claim 11, wherein the step of effecting performance of the at least one test comprises establishing a sandbox for performance of the at least one test.

13. The method of claim 11, wherein the step of effecting performance of the at least one test comprises:

establishing a device emulator, wherein the device emulator is configured to emulate an identified end user device; and configuring the device emulator to run the application.

14. The method of claim 11, wherein the step of effecting performance of the at least one test comprises configuring at least one test device to run the application, and wherein the at least one test device is an identified end user device.

15. The method of claim 11, wherein the step of effecting performance of the at least one test comprises testing an interaction between the application and an API simulator.

16. The method of claim 11, wherein the step of effecting performance of the at least one test comprises testing an interaction between the application and a live API, including throttling the rate at which messages originating from the application are transmitted to the live API.

17. The method of claim 11, wherein the step of effecting performance of the at least one test comprises selecting a test script for execution in association with the application, and wherein selection of the test script is based on the first plurality of certification requirements.

18. The step of claim 11, wherein the step of providing the application to the at least one other device comprises providing the application to an application store server.

19. The method of claim 11, further comprising facilitating, by the prototyping suite, the creation of demand for the application.

20. A tangible and non-transitory machine-readable storage medium encoded with instructions for execution by a prototyping suite for facilitating application development by a developer using a developer device, the tangible and non-transitory machine-readable storage medium comprising:

instructions for receiving, by the prototyping suite from the developer device, code defining an application;

instructions for effecting performance of at least one test in association with the application to produce at least one test result;

instructions for identifying a first end user device of a set of end user devices indicated by the developer as an intended platform for the application;

instructions for identifying a first plurality of certification requirements as being associated with the first end user device of the set of end user devices, wherein the prototyping suite has access to a second plurality of certification requirements that are associated with a second end user device of the set of end user devices that is different from the first end user device of the set of end user devices;

instructions for analyzing the at least one test result to determine whether the application meets a certification requirement of the first plurality of certification requirements; and instructions for providing the application to at least one other device when the application meets each certification requirement of the first plurality of certification requirements.

21. The tangible and non-transitory machine-readable storage medium of claim 20, wherein the instructions for effecting performance of the at least one test comprise instructions for establishing a sandbox for performance of the at least one test.

22. The tangible and non-transitory machine-readable storage medium of claim 20, wherein the instructions for effecting performance of the at least one test comprise:

instructions for establishing a device emulator, wherein the device emulator is configured to emulate an identified end user device; and instructions for configuring the device emulator to run the application.

23. The tangible and non-transitory machine-readable storage medium of claim 20, wherein the instructions for effecting performance of the at least one test comprise instructions for configuring at least one test device to run the application, and wherein the at least one test device is an identified end user device.

24. The tangible and non-transitory machine-readable storage medium of claim 20, wherein the instructions for effecting performance of the at least one test comprise instructions for testing an interaction between the application and an API simulator.

25. The tangible and non-transitory machine-readable storage medium of claim 20, wherein the instructions for effecting performance of the at least one test comprise instructions for testing an interaction between the application and a live API, including instructions for throttling the rate at which messages originating from the application are transmitted to the live API.

26. The tangible and non-transitory machine-readable storage medium of claim 20, wherein the instructions for effecting performance of the at least one test comprise instructions for selecting a test script for execution in association with the application, and wherein selection of the test script is based on the first plurality of certification requirements.

27. The tangible and non-transitory machine-readable storage medium of claim 20, further comprising instructions for facilitating, by the prototyping suite, the creation of demand for the application.

* * * * *